E. W. WEBB.
ROLLER SIDE BEARING FOR CARS.
APPLICATION FILED SEPT. 21, 1914.

1,239,547.

Patented Sept. 11, 1917.

Witnesses.
A. H. Opsahl.
E. C. Skinkle.

Inventor
Edwin W. Webb.
By his Attorneys
Williamson Merchant

E. W. WEBB.
ROLLER SIDE BEARING FOR CARS.
APPLICATION FILED SEPT. 21, 1914.

1,239,547.

Patented Sept. 11, 1917.
2 SHEETS—SHEET 2.

Witnesses
A. H. Opsahl
E. C. Skinkle

Inventor
Edwin W. Webb
By his Attorneys
Williamson Richards

UNITED STATES PATENT OFFICE.

EDWIN W. WEBB, OF CHICAGO, ILLINOIS, ASSIGNOR TO STANDARD CAR TRUCK COMPANY, OF CHICAGO, ILLINOIS, A CORPORATION OF NEW JERSEY.

ROLLER SIDE BEARING FOR CARS.

1,239,547.  Specification of Letters Patent.  Patented Sept. 11, 1917.

Application filed September 21, 1914. Serial No. 862,744.

*To all whom it may concern:*

Be it known that I, EDWIN W. WEBB, citizen of the United States, residing at Chicago, in the county of Cook and State of Illinois, have invented certain new and useful Improvements in Roller Side Bearings for Cars; and I do hereby declare the following to be a full, clear, and exact description of the invention, such as will enable others skilled in the art to which it appertains to make and use the same.

My invention has for its object to provide an improved roller side bearing for car trucks, of the type wherein the car trucks have a radial motion in respect to the car body; and the present invention is in the nature of an improvement on the roller bearing disclosed and claimed in the prior patent to John C. Barber, No. 987,422, of date March 21, 1911.

The invention is illustrated in the accompanying drawings, wherein like characters indicate like parts throughout the several views.

Referring to the drawings:—

Figure 1:
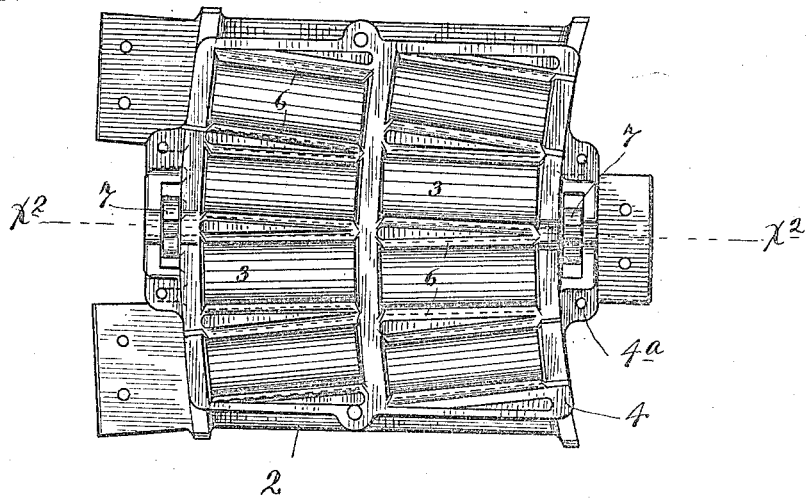
Figure 1 is a plan view of the improved bearing, with the upper roller bearing plate or member removed.

The numerals 1 and 2 indicate, respectively, the upper and lower bearing plates, between which the rollers 3 are interposed. To secure the best results in car construction, wherein the rollers are radially disposed, said rollers are arranged in two concentric series, and these sets of rollers are properly spaced and properly positioned between the upper and lower bearing plates, by a so-called roller spacing cage, made up of two flat plates 4 placed face to face and, as shown, rigidly connected, at their ends, by rivets 5. Both the upper and lower plates 4 have openings in which the rollers are seated, and, at the longitudinal edges of these openings, the said plates are provided with upwardly and downwardly extended segmental roller-retaining flanges 6. The roller-retaining flanges 6 terminate, at their edges, at such points that they do not engage either the upper bearing plate 1 or the lower plate 2, but nevertheless loosely hold the rollers interlocked and the cage plates, properly spaced apart and free from rotation, under frictional engagement of said upper and lower bearing plates.

In the roller bearing of the prior Patent 987,422, above identified, to keep the rollers always in proper relative position, in respect to the bearing plates 1—2, a toothed wheel or pinion was journaled to the roller cage and arranged for engagement with upper and lower segmental rows of rack teeth formed on the upper and lower surfaces of the said bearing plates 1—2. The said arrangement, while an improvement over the prior art, was not, in all respects, completely satisfactory. The pinion, being at the center of the bearing plates and cage, did not positively and independently move the inner and outer edges of the roller cage, and it was found that dirt would, under certain conditions, accumulate in the rack teeth and interfere with movements of the pinion.

In my present invention, I remove the above noted results, and, at the same time, retain all the good features of the prior construction, by employing two pinions 7, which are set into recesses formed, one in the inner, and the other in the outer central edge portions $4^a$ of the cage-forming plates 4. Furthermore, these pinions 7 are formed with trunnions that are journaled in seats formed by bulging adjacent portions of the said cage-forming plates. These trunnions 7 mesh with rack teeth 8 formed on the inner and outer edge portions of the bearing plates 1—2. The upper rack teeth 8 are open at their outer sides, but the lower bearing plate 2 is provided with inner and outer extensions $2^a$ that project beyond the lower rack teeth 8, and to which are riveted, or otherwise rigidly secured, retaining brackets 9, the hook-like upper ends of which overlap the adjacent edges of the upper bearing plate 1, and hold the said plates 1—2 against accidental separation, while permitting the free traveling movement of the one in respect to the other.

Figure 2:
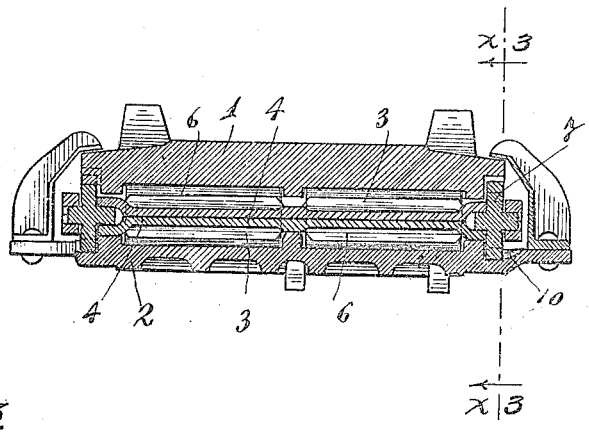
Fig. 2 is a vertical section, taken through the bearing approximately on the line $x^2$ $x^2$ of Fig. 1.
Figure 3:
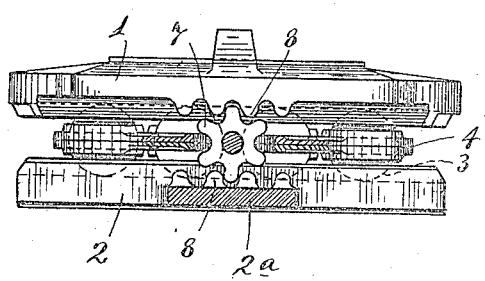
Fig. 3 is a side elevation of the bearing, with some parts sectioned on the line $x^3$ $x^3$ of Fig. 2.
Figure 4:
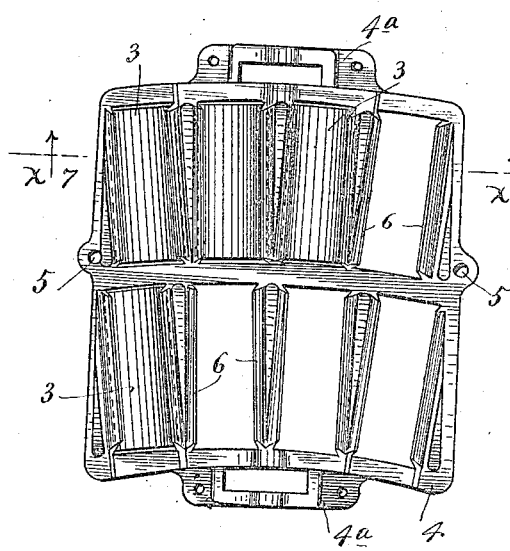
Fig. 4 is a plan view of the roller bearing cage, with some of the rollers in position and some removed.
Figure 5:
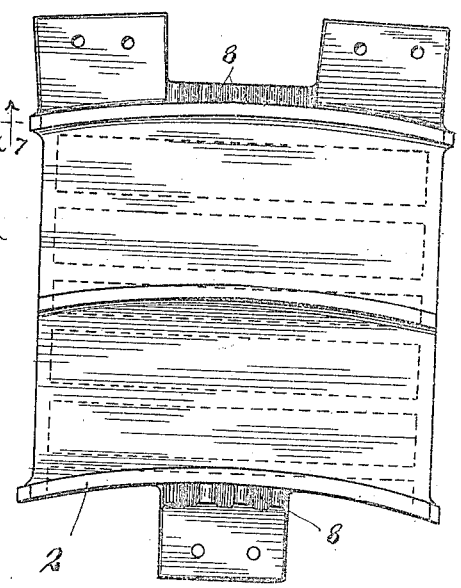
Fig. 5 is a plan view of the lower roller bearing plate or member.
Figure 6:
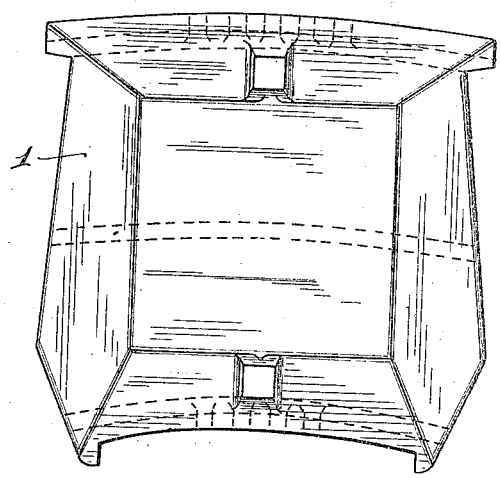
Fig. 6 is a plan view of the upper roller bearing plate or member.
Figure 7:
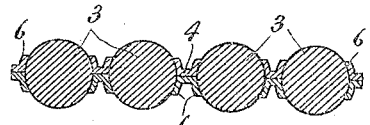
Fig. 7 is a section taken on the line $x^7$ $x^7$ of Fig. 4.
Figure 8:
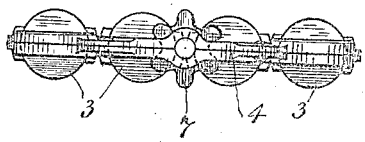
Fig. 8 is a side elevation of the parts shown in Fig. 4.

To give dirt a chance to crowd or work itself out of the spaces between the lower rack teeth 8, the plate extensions $2^a$ are scooped out or cut away, as indicated, at 10, best shown on Fig. 2.

It is evident that when the two bearing plates 1—2 are oscillated, in respect to each other, as will happen, for example, when a car travels from a straight track onto a curved track, or vice versa, the two pinions 7 will simultaneously operate and positively impart to the inner and outer edges of the roller-spacing cage such movements that the rollers will always be maintained in their proper relative positions, in respect to the said upper and lower bearing plates. Otherwise stated, the rollers cannot work or crowd in one direction or the other, so that they will not occupy medial positions, in respect to the said upper and lower bearing plates.

What I claim is:—

1. The combination with upper and lower roller bearing plates, interposed rollers and a cage therefor, of independently rotatable pinions journaled on the cage, said upper and lower plates having at their inner and outer edges rack teeth meshing with the pinions, said edges of the lower roller bearing plate terminating at the outer ends of the rack teeth formed therein to permit the escape of dirt thereover.

2. The combination with upper and lower roller bearing plates having on their opposing faces laterally spaced flanges and rack teeth located outward thereof, of rollers interposed between said plates and held by the flanges thereof against axial movement, a cage for the rollers, and pinions journaled on the cage and meshing with the rack teeth.

3. The combination with upper and lower roller bearing plates having on their opposing faces laterally spaced segmental flanges and rack teeth located outward thereof, of rollers interposed between said plates and held by the flanges thereof against axial movement, a cage for the rollers, and a pair of axially alined independently rotatable pinions journaled on the cage and meshing with the rack teeth.

4. The combination with upper and lower roller bearing plates and interposed rollers, said plates having on their outer and inner edges rack teeth, of a cage for the rollers, and a pair of axially alined pinions journaled on the cage, held thereby against axial movement and meshing with the rack teeth, said pinions holding the cage in a medial position in respect to said plates, said edges of the lower roller bearing plate terminating at the outer ends of the rack teeth formed therein to permit the escape of dirt thereover.

5. The combination with upper and lower roller bearing plates, interposed rollers and a cage therefor, of means for causing the cage to maintain a medial position in respect to said plates, rack teeth formed on the outer and inner edges of said plates, pinions journaled on the cage and meshing with the rack teeth, and brackets on one of said plates overlapping the other thereof and holding said plates against accidental separation and arranged to permit the pinions to travel thereunder.

In testimony whereof I affix my signature in presence of two witnesses.

EDWIN W. WEBB.

Witnesses:
F. L. BARBER,
CHAS. S. WALTON.

Copies of this patent may be obtained for five cents each, by addressing the "Commissioner of Patents, Washington, D. C."